(12) United States Patent
Cambre et al.

(10) Patent No.: US 7,965,185 B2
(45) Date of Patent: Jun. 21, 2011

(54) INSERTABLE FORM FACTOR FOR AN INSTRUMENT TRAY

(75) Inventors: Christopher Cambre, Collierville, TN (US); Steven M. Tethrake, Collierville, TN (US); Robert Varner, Germantown, TN (US)

(73) Assignee: Warsaw Orthopedic, Inc., Warsaw, IN (US)

( * ) Notice: Subject to any disclaimer, the term of this patent is extended or adjusted under 35 U.S.C. 154(b) by 1246 days.

(21) Appl. No.: 11/423,786

(22) Filed: Jun. 13, 2006

(65) Prior Publication Data

US 2007/0284428 A1 Dec. 13, 2007

(51) Int. Cl.
*G08B 13/14* (2006.01)
(52) U.S. Cl. ............... 340/572.1; 340/572.8; 340/539.1; 235/375
(58) Field of Classification Search ........... 340/572.1, 340/572.4, 572.8, 539.1, 539.12, 825.69; 235/375, 376, 380, 383, 381, 385; 702/183, 184

See application file for complete search history.

(56) References Cited

U.S. PATENT DOCUMENTS

| | | | |
|---|---|---|---|
| 4,075,632 A | 2/1978 | Baldwin et al. | |
| 4,360,801 A | 11/1982 | Duhame | |
| 4,390,880 A | 6/1983 | Henoch | |
| 4,739,328 A | 4/1988 | Koelle et al. | |
| 5,030,807 A | 7/1991 | Landt et al. | |
| 5,291,127 A * | 3/1994 | Park et al. | 324/757 |
| 5,794,784 A * | 8/1998 | Murphy | 206/725 |
| 6,861,289 B2 * | 3/2005 | Baar et al. | 438/115 |
| 7,118,029 B2 * | 10/2006 | Nycz et al. | 235/375 |
| 2006/0109105 A1 * | 5/2006 | Varner et al. | 340/539.12 |
| 2006/0244597 A1 | 11/2006 | Tethrake et al. | |

* cited by examiner

*Primary Examiner* — Hung T. Nguyen

(57) ABSTRACT

An apparatus including a device having a slot formed on an exterior wall and a slot wall within the slot. A form factor may be insertable into the slot. The form factor also may include a transmitter embedded in the form factors wherein the transmitter is adapted to wirelessly communicate identification data.

11 Claims, 11 Drawing Sheets

INSERTABLE FORM FACTOR FOR AN INSTRUMENT TRAY

FIELD OF THE INVENTION

Exemplary embodiments generally relate to instrument trays, and more particularly generally relate to identification of instrument trays.

DESCRIPTION OF RELATED ART

Surgical instrument storage and sterilization systems are known in the art. These systems, referred to as surgical instrument trays, surgical instrument kits, surgical trays, and/or surgical kits, typically consist of trays or boxes that hold a variety of general purpose and/or procedure specific surgical instruments, such as forceps, scissors, clamps, retractors, scalpels, etc. These surgical instrument trays are brought into the operating room (OR) when preparing for surgery, and also are used as a means to organize and store surgical instruments in a medical facility and even to transport instruments in and out of medical facilities.

Due to advances in medical technology that have increased the number of surgical instruments now in use and due to the constant pressure in the health care industry to reduce operating costs, it has become necessary to efficiently manage and track these instrument trays. One advancement towards this end has been the creation of surgical instrument trays that employ various techniques for controlling the arrangement of instruments on the tray so that any missing instruments can be quickly identified. Once such method is disclosed in U.S. Pat. No. 6,158,437, which uses a combination of instrument identifying indicia including a plurality of graphical indicia that represent an outline of the basic shape of each instrument, as well as a short written description of the instrument, to identify the correct placement of specific surgical instruments on the tray.

Another method of monitoring the contents of surgical instrument trays is disclosed in U.S. Pat. No. 6,426,041, which utilizes a plurality of recessed sections of applicable shape and size distributed on a work surface of the tray to accommodate specific instruments. Upon removal from the tray, the instruments are in ready position to be relayed to the person performing the operation. U.S. Pat. Nos. 6,158,437 and 6,426,041 are hereby incorporated by reference in their entireties. Through implementation of the teachings of these patents, a person can visually inspect a surgical instrument tray and make a determination as to whether any instruments are missing or misplaced.

Another function provided by surgical trays is to facilitate group sterilization. Sterilization is of paramount importance in a surgical setting, such as a hospital, to prevent patients undergoing surgery from contracting potentially deadly infections. Prior to every surgical procedure, all surgical instruments and trays must be sterilized. Following each surgical procedure, all instruments on a given tray, if not separately wrapped, must be re-sterilized before subsequent usage whether soiled or not. In order to increase the speed and efficiency of sterilization, entire surgical trays containing multiple instruments often are placed in a sterilization chamber at once. The sterilization chamber may apply to the trays and all the instruments contained therein any combination of heat, pressure, and/or fluid or vaporous sterilant. Sterilization techniques are ubiquitously well known in the art. Thus, a detailed discussion of them has been intentionally omitted.

Over time, and through ordinary usage, as well as due to the harshness of the sterilization process, surgical instruments suffer wear and tear and eventually reach the end of their life cycle. Thus, it has become necessary to periodically inspect and maintain records on usage of surgical instruments so that they can be replaced as necessary. Also, due to the fact that instruments are constantly moved from the operating room to sterilization, to storage, and back to the operating room, various instruments on a given tray may become lost, or unrelated instruments from other trays may be added. Because certain instruments are so specialized that there are no functional substitutes, it has become necessary to regularly inspect trays for any missing instruments and to readily identify specific instruments that are missing. Existing methods for tracking surgical instruments and trays are overly reliant on costly human interpretation. As with any human inspection process, the results are limited by the skill and accuracy of the person doing the inspecting.

The description herein of various advantages and disadvantages associated with known apparatus, methods, and materials is not intended to limit the scope of the invention to their exclusion. Indeed, various embodiments of the invention may include one or more of the known apparatus, methods, and materials without suffering from their disadvantages.

SUMMARY OF THE INVENTION

There is a need for an improved system, method, and apparatus for identifying and tracking trays.

A tray according to exemplary embodiments may include a sidewall having a slot formed therein, where the slot may be adapted to engage a form factor. The form factor may have an embedded transmitter. When the form factor is inserted into the slot, the transmitter may be adapted to communicate information useable to identify the tray.

A method according to exemplary embodiments may include forming a slot in a sidewall of a tray, and inserting a form factor into the slot. The form factor may have a transmitter embedded therein, wherein the transmitter may be adapted to communicate information useable to identify the tray.

A system according to exemplary embodiments may include an access point, a tray having a slot, a form factor that may be adapted to be inserted into the slot, and a transmitter that may be embedded in the form factor, wherein when the form factor is inserted into the slot, the transmitter may be adapted to communicate data with the access point to identify the tray.

An apparatus according to exemplary embodiments may include a device having a slot formed on an exterior wall and a slot wall within the slot, a form factor that may be adapted to be inserted into the slot. The form factor may include a first end surface that may be adapted to frictionally engage the slot wall during insertion, and a transmitter embedded in the form factor, wherein the transmitter may be adapted to wirelessly communicate identification data.

An apparatus according to exemplary embodiments may include a transmitter embedded within the apparatus, the transmitter may store information useable to identify the apparatus and/or the transmitter, a first end surface positioned on a first end of the apparatus, a second end surface positioned on the first end of the apparatus, and a recess wall positioned between the first end surface and the second end surface, wherein at least one of the first end surface and the second end surface is adapted to frictionally engage a first slot wall within a slot formed in an exterior wall of a device.

These and other embodiments and advantages will become apparent from the following detailed description, taken in conjunction with the accompanying drawings, illustrating by way of example the principles of the various exemplary embodiments.

BRIEF DESCRIPTION OF THE DRAWINGS

Purposes and advantages of the embodiments will be apparent to those of ordinary skill in the art from the following detailed description in conjunction with the appended drawings in which like reference characters are used to indicate like elements, and in which.

Figure 1:
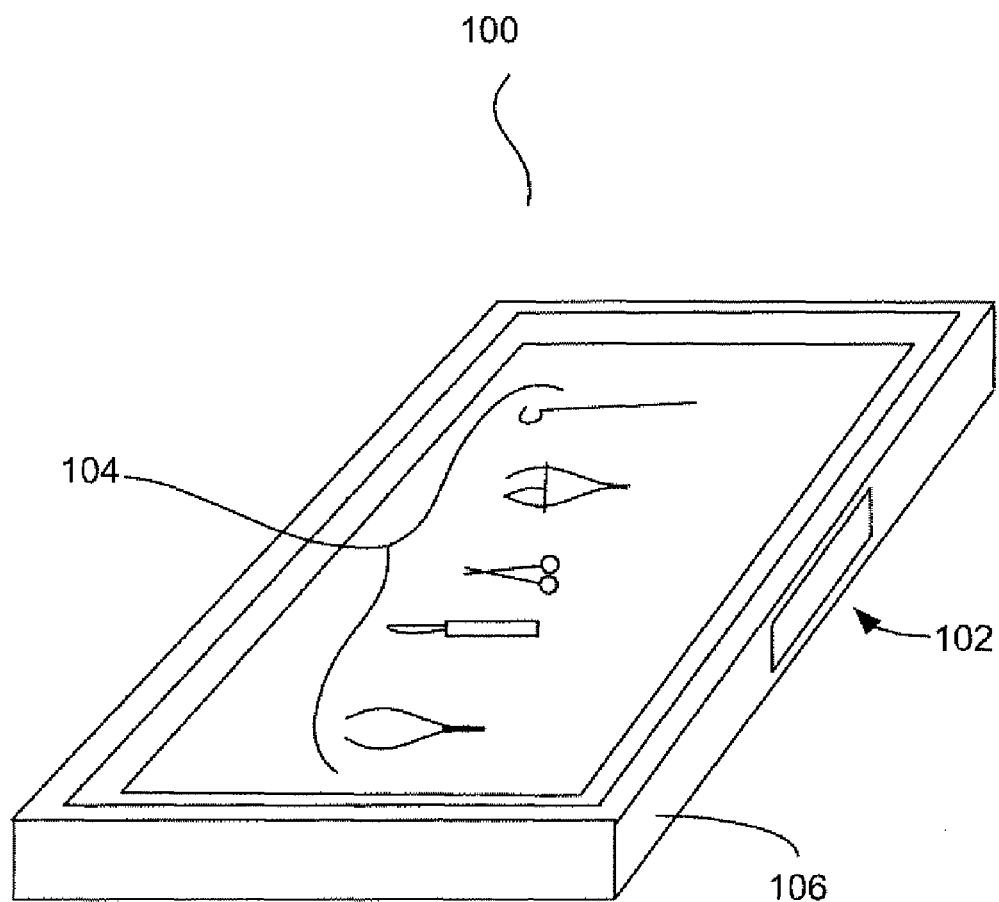
FIG. 1 illustrates a perspective view of an exemplary embodiment of a tray.

These and other embodiments and advantages will become apparent from the following detailed description, taken in conjunction with the accompanying drawings, illustrating by way of example the principles of the various exemplary embodiments.

DETAILED DESCRIPTION

The following description is intended to convey a thorough understanding of the embodiments described herein by providing a number of specific exemplary embodiments and details involving trays, methods of manufacturing trays, and systems for tracking trays. It is understood, however, that the various embodiments are not limited to these specific embodiments and details, which are exemplary only. It is further understood that one possessing ordinary skill in the art, in light of known systems and methods, would appreciate the use of the exemplary embodiments for their intended purposes and benefits in any number of alternative embodiments, depending upon specific design and other needs.

The terminology used herein is for the purpose of describing particular embodiments only and is not intended to limit the scope of the present invention. As used throughout this disclosure, the singular forms "a," "an," and "the" include plural references unless the context clearly dictates otherwise. Thus, for example, a reference to "a tray" includes a plurality of such trays, as well as a single tray, and a reference to "a slot" is a reference to one or more slots and equivalents thereof known to those skilled in the art, and so forth.

Unless defined otherwise, all technical and scientific terms used herein have the same meanings as commonly understood by one of ordinary skill in the art to which this invention belongs. All publications mentioned herein are cited for the purpose of describing and disclosing the various implants, prosthesis, components, methods of implantation, coatings and surface treatments, and other components that are reported in the publications that might be used in connection with the embodiments. Nothing herein is to be construed as an admission that the embodiments described herein are not entitled to antedate such disclosures by virtue of prior invention.

As used herein, the term "transmitter" may refer to any active or passive type of electronic data storage device, read-only, or read and write, that may be wirelessly activated in the presence of a radio frequency (RF) field, and may include, but is not limited to, any currently available inductively or capacitively coupled RFID tags, and even future wireless tags not yet available. The various exemplary embodiments may include RFID tags operating in the 125 kHz, 13.56 MHz, 860-960 MHz, 2.45 GHz, and 5.8 GHz frequency bands, as well as other suitable frequency bands.

As used herein, the expressions and terms "surgical tray," "tray," or "device" may refer to any type of surgical or medical tray, portable equipment or device, tool or hand tool, to which it may be desirable to attach a transmitter. Though the specification is written in the context of medical and/or surgical trays, it should be appreciated that the various exemplary embodiments may be used with a variety of different items as shape and design constraints permit, including tools, trays, and equipment in other fields unrelated to the medical field. This may include objects and/or equipment that are used in construction, manufacturing, maintenance, or other related or unrelated industries. All of these uses are within the intended scope of the various exemplary embodiments.

There is a need to identify surgical instrument trays using a transmitter, which may withstand the rigors of sterilization, where the transmitter may be retrofitted to existing trays and may be manufactured with minimal modification to existing transmitter designs. In various exemplary embodiments, the transmitter may be attached securely to objects, such as, but not limited to, surgical instrument trays, and may be sufficiently ruggedized to permit use in moist, heated, cooled, pressurized and/or other destructive environments. As discussed herein, placing a transmitter on a tray may permit efficient tracking and distribution of trays in medical facilities, in distribution warehouses, in sterilization facilities, and/or in other environments.

FIG. 1 illustrates an exemplary embodiment of a tray 100 including multiple of instruments 104 placed thereon. The tray 100 may be composed of a plastic or other non-corrosive, relatively lightweight material, such as, but not limited to, titanium or stainless steel. The tray 100 may be flat, or alternatively, also may contain one or more recesses shaped to receive one or more surgical instruments. In an alternative exemplary embodiment, the tray 100 may be a kit that includes a drawer or box for enclosing the surgical instruments when direct access to the individual instruments is not required.

Figure 2:
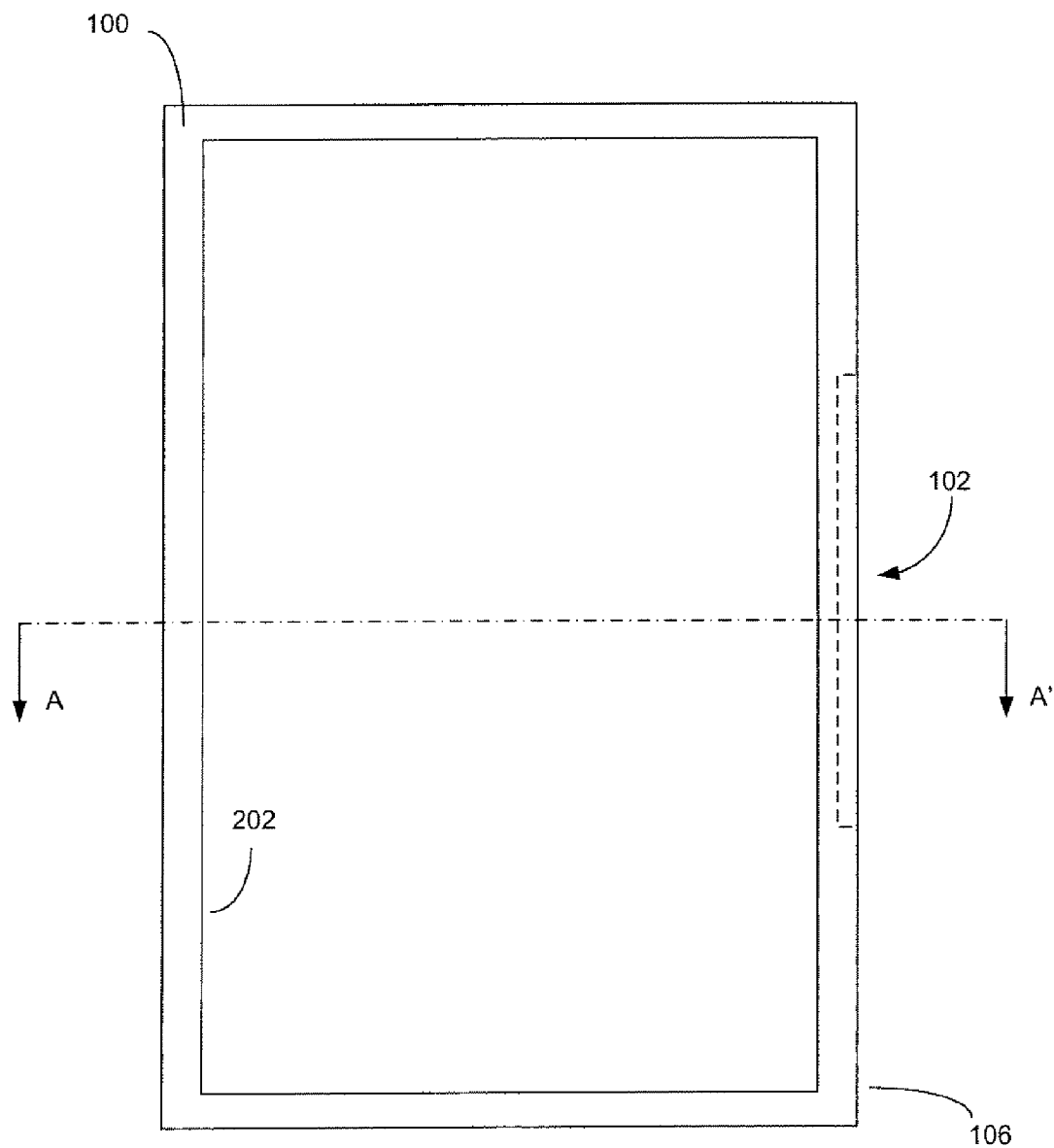
FIG. 2 illustrates a top view of an exemplary embodiment of a tray.
Figure 3A:
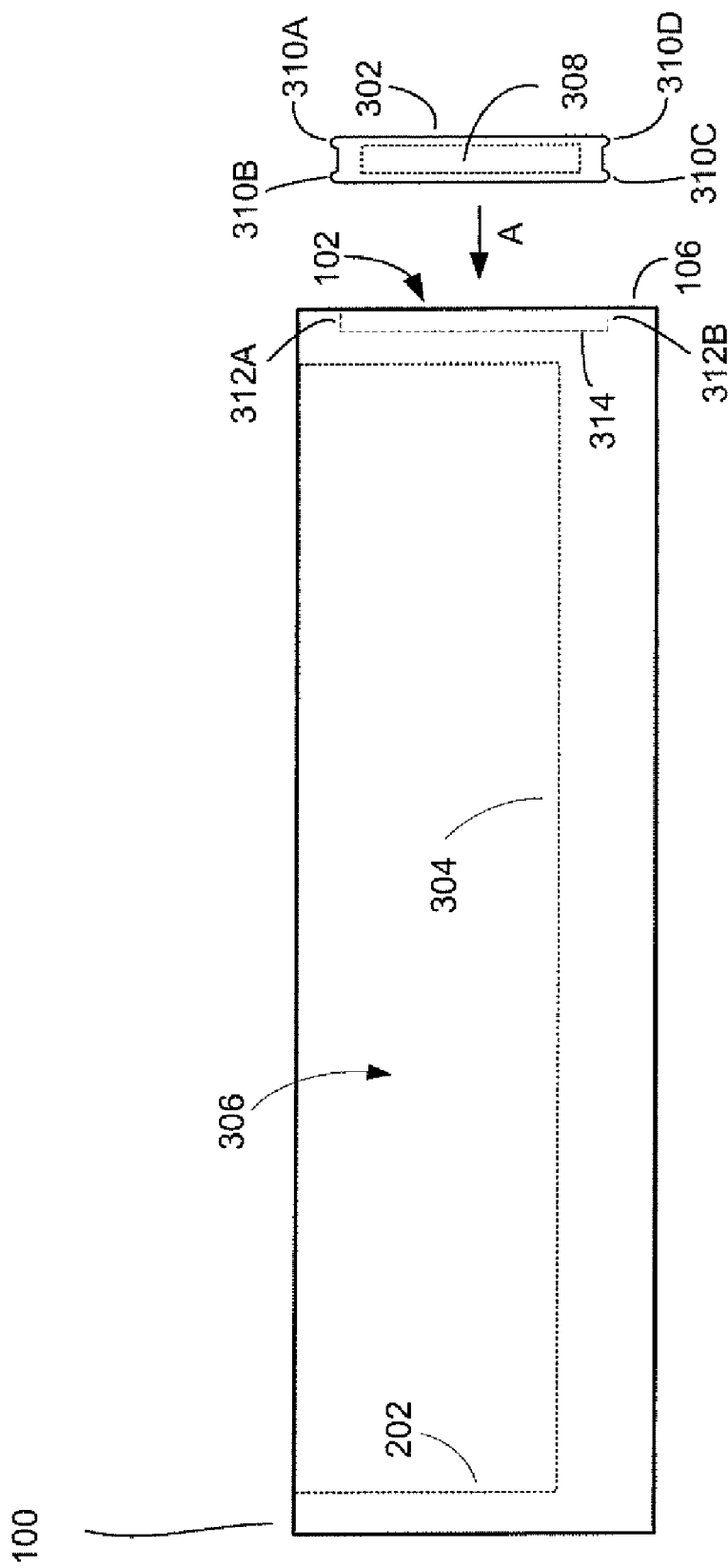
FIGS. 3A-B illustrate a cross-sectional view of an exemplary embodiment of a tray along line A-A' of FIG. 2 and an exemplary embodiment of a form factor.
Figure 3B:
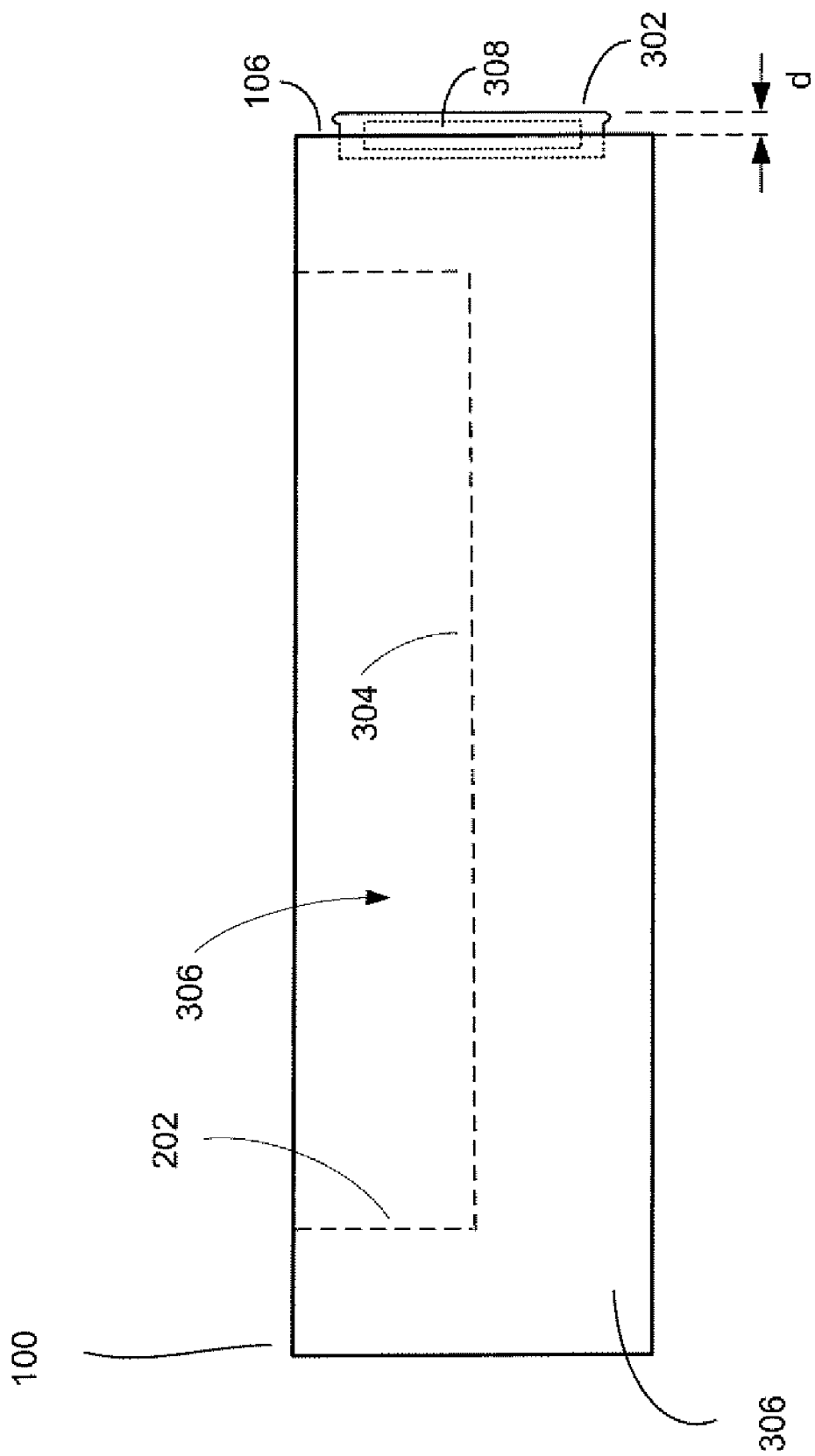

Exemplary embodiments of the tray 100 may be further illustrated in FIGS. 2 and 3A-B. FIG. 2 is a top view of an exemplary embodiment of a tray 100, and FIGS. 3A-B illustrate a cross-sectional view of an exemplary embodiment of a tray 100 along line A-A' of FIG. 2 and a form factor enclosing a transmitter insertable into a slot 102. The tray 100 may have a box-like structure and may have a recessed section 306 for holding the instruments 104. Alternatively, the tray 100 may be of other asymmetric, symmetric, geometric, or other shapes, as will be appreciated by those skilled in the art. The recessed section 306 may be bounded by a planar top surface 304 that may be surrounded on its perimeter by a perimeter wall 202 (see FIGS. 2 and 3A) that may prevent instruments from sliding off of the tray 100 when the planar top surface 304 is substantially parallel with the ground.

The slot 102 may be formed in a side wall 106 on the exterior of the tray 100. The slot 102 may be pre-stamped in the tray 100 when the tray 100 is manufactured (i.e., the die for the tray 100 may include the slot 102), or alternatively, the slot 102 may be formed by cutting into an exterior surface of the tray 100. As depicted, the slot 102 may be a rectangular recess in the side wall 106. Alternatively, the slot 102 may be of other geometric, symmetric, asymmetric, and/or other shapes and sizes, as will be appreciated by those of skill in the art. The slot 102 may be adapted to receive a form factor 302.

The form factor 302 may be insertable within the slot 102. As depicted in FIG. 3A, the form factor 302 may respectively include end surfaces 310A-D on the top and bottom surfaces of the form factor, and may have a transmitter 308 embedded therein. In an exemplary embodiment, the end surfaces 310A-D may be rounded. The form factor 302 may be formed into a variety of different shapes, sizes, and configurations through an injection molding process, or other similar or different plastic or metal or composite material molding processes, as will be appreciated by those skilled in the art.

In various exemplary embodiments, the form factor 302 may encapsulate the transmitter 308 in one or more materials such as, but not limited to, a reinforced thermoplastic, a thermally resistant polymer, a plastic, a resin, a glass, rubber, graphite, Lucite, an amorphous thermoplastic polyetherimide, a polyphenylene sulfide, ceramic materials, ceramic/metal composites, combinations thereof, and/or other known materials, that protect internal circuitry of the transmitter 308 from exposure to outside environments, but also may allow wireless signals, such as, but not limited to, radio frequency signals, to propagate through the material. These encapsulation materials also may be tough and may not easily crack or flex in allowing the form factor 302 to be inserted and/or removed from the tray 100. Additionally, these encapsulation materials may have a sufficiently low dielectric that may permit a wireless signal to propagate therethrough without distorting, interfering, attenuating, and/or absorbing the wireless signal in such a way to prevent a reader device from receiving the wireless signal from the transmitter 308. As will be appreciated by those skilled in the art, the encapsulation material may have some affect on the wireless signal as it propagates, but not a sufficient effect to prevent the wireless signal from being receivable by the reader device when the transmitter 308 is within range of the reader device.

In various exemplary embodiments, the form factor 302 may be dimensioned such that the transmitter 308 may be maintained at a minimum distance from metal within the tray 100 when the form factor 302 is fully inserted. At 915 MHz, this minimum distance may be at least 0.10-0.15 inches. This may ensure that metal content in the tray 100 does not significantly interfere with and/or affect the readability of wireless signals emitted from the transmitter 308. Other distances also may be used. Alternatively, any other material other than metal that interferes with, absorbs, and/or attenuates wireless or electromagnetic signals used in the tray 100 also may affect the minimum distance required. The tray 100 may be composed of interfering materials, absorbing materials, and/or metal, or neither, as will be appreciated by those skilled in the art.

Generally, the size of the form factor 302, the antenna design, efficiency of the transmitter 308, the encapsulation materials of the form factor, and the performance characteristics of the transmitter 308 may be used to determine the required distance from the metal of the tray 100 for optimal performance. The radiating antenna and the environmental factors such as, but not limited to, reflective surfaces (e.g., but not limited to, metal), absorptive surfaces (e.g., but not limited to, water or carbon), reader equipment, software characteristics, and required reader range and rate are some of the factors that may affect the overall efficiency of the transmitter 308. These factors may require a larger or smaller minimum distance from any material that interferes with, absorbs, and/or attenuates electromagnetic signals. Alternatively, the form factor 302 may be placed at other locations if the tray 100 is not composed of interfering materials, absorbing materials, and/or metal that may affect wireless signals. Nevertheless, by placing the form factor 302 on an exterior wall of the tray 100, the metal and/or any other absorbing, attenuating, and/or interfering material of the tray 100 may not substantially affect signals communicated by the transmitter 308 in the direction away from the tray 100.

In various exemplary embodiments, the form factor 302 may protect circuitry of the transmitter 308 against one or more of the following environmental hazards: heat, cold, moisture, overpressure, shock, torsion, compression, sterilization, and/or any combination thereof. In various exemplary embodiments, a thickness of the walls of the form factor 302 surrounding the transmitter 308 may be substantially uniform. In an alternative embodiment, the walls may be non-uniform or may have irregular thicknesses. For example, the thickness of the rounded end surfaces 310 may be increased to enhance their ability to absorb an impact. Other adjustments to the form factor 302 also may be made to protect the transmitter 308, as will be appreciated by those skilled in the art.

Figure 4A:
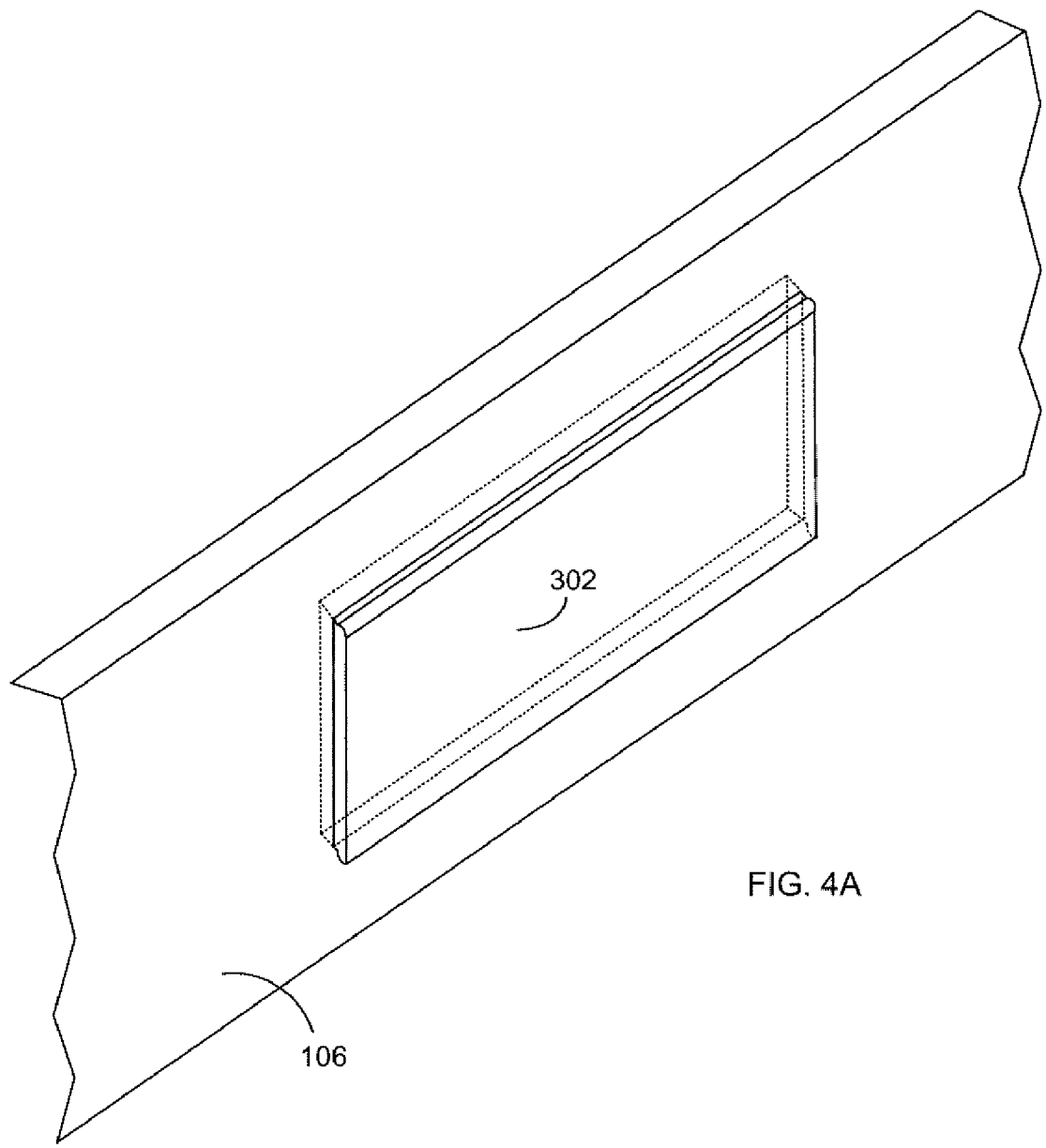
FIGS. 4A-B illustrate a partial perspective view of an exemplary embodiment of a form factor inserted into a tray.
Figure 4B:
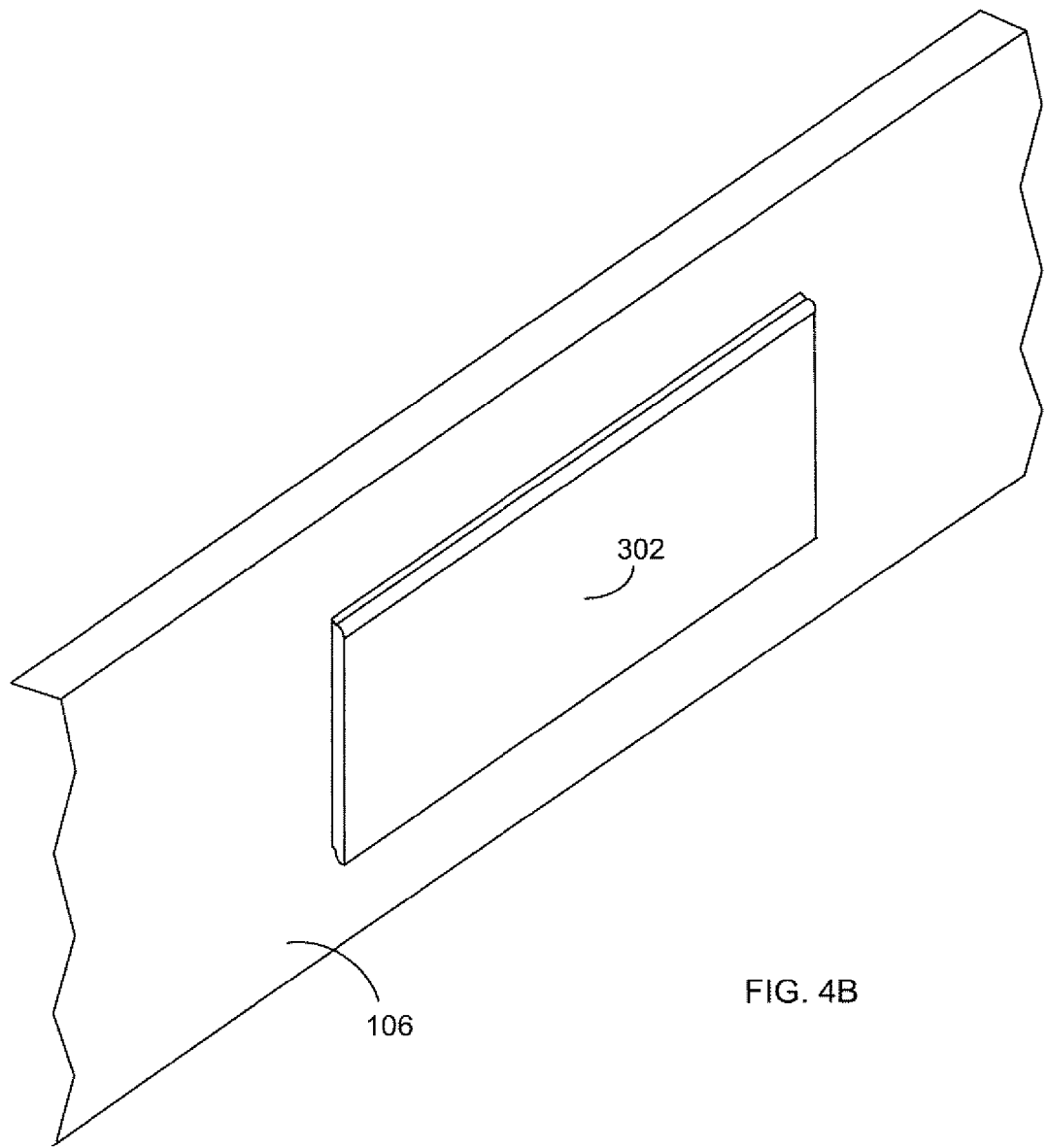

To insert the form factor 302 into the slot 102 of the tray 100, a user may apply a force to the form factor 302 in the direction of Arrow A in FIG. 3A. FIG. 3B depicts an exemplary embodiment of the form factor 302 after insertion into the slot 102. FIGS. 4A-B depict additional perspective views of the form factor 302 inserted within the slot 102. FIG. 4A includes dashed lines further illustrating the non-visible portion of the form factor 302 within the slot 102, and FIG. 4B depicts only the portions of the inserted form factor 302 that are externally visible.

The rounded end surfaces 310B and 310C may frictionally engage the upper and lower walls 312A-B of the slot 102 as the form factor 302 is forced into the slot 102 (see FIG. 3A-B). Alternatively, a user may insert the other side of the form factor 302 into the slot 102, where the rounded end surfaces 310A and 310D may frictionally engage the upper and lower walls 312A-B of the slot 102. The frictional engagement of the rounded end surfaces 310B-C with the slot 102 may prevent the form factor 302 from being accidentally removed from the tray 100. Insertion of the form factor 302 may compress the rounded surfaces 310B-C such that they may no longer appear rounded within the slot 102 (see FIGS. 3B and 4A). Alternatively, the rounded end surfaces 310A-B may maintain some or all of their rounded shape after insertion into the slot 102. Additionally, the rounded shape of the rounded end surfaces 310A-D may enhance the ability of the transmitter 308 to withstand impact and any other type of physical damage if a user drops the form factor 302.

The form factor 302 only may be partially inserted into the slot 102 when the form factor 302 contacts end wall 314 of the slot 102. As depicted in FIG. 3B, the outer wall of the form factor 302 may laterally extend beyond the surface of the side wall 106 by a distance 'd.' The plane of the outer wall of the form factor 302 may be substantially parallel to the plane of the side wall 106. The distance 'd' may be adjusted as desired, as will be appreciated by those of skill in the art. The form factor 302 may, alternatively, be inserted completely within the slot 102 so that the outer wall of the form factor 302 is flush with the side wall 106 (i.e., d is approximately equal to zero and the outer wall substantially corresponds to the plane of the side wall 106). The form factor 302 also may be inset further from the side wall 106 when inserted such that the outer wall of the form factor 302 may be recessed with respect to the side wall 106 (i.e., d is less than zero). In other words, the plane of the outer wall does not laterally extend beyond the surface of the side wall 106. Inserting the form factor 302 within the slot 102 also may be referred to as snapping the form factor 302 into the slot 102. In the depicted embodiment, the outer walls of the form factor 302 are depicted as being planar. The outer walls may be, however, non-planar, and/or symmetric, asymmetric, geometric, and/or other shapes, and also may differ from one another, as will be appreciated by those skilled in the art.

In various exemplary embodiments, the form factor 302 also may be removable from the slot 102. A user may grip the rounded end surfaces 310A and 310D and pull on the form factor 302 to overcome the frictional engagement of the rounded end surfaces 310B and 310C with the walls 312A-B of the slot 102. Alternatively, once inserted, the form factor 302 may be permanently attached to the tray 100 using an adhesive. In a further alternative exemplary embodiment, the frictional engagement of the form factor 302 within the slot 102 may not be overcome without damaging and/or destroying the form factor 302 during removal.

By having the form factor 302 attached within the slot 102 on an exterior surface of the tray 100, the form factor 302 may less likely be unintentionally knocked off the tray 100. Moreover, inserting the form factor 302 into the slot 102 may provide the benefit of eliminating the need for holes, ejector pin marks, adhesives, or other devices that would otherwise be required to physically attach the form factor 302 to the tray 100. Furthermore, the form factor 302 may be reusable with multiple trays, which may be beneficial for attaching the form factor 302 to a tray received from a third party to identify and track third party trays having loaner and consignment instrument sets. Additionally, the form factor 302 may not detract from the overall appearance of the tray 100 since the form factor 302 may be inserted into the tray 100 and may be inserted so that the form factor 302 may be minimally visible.

Figure 5:
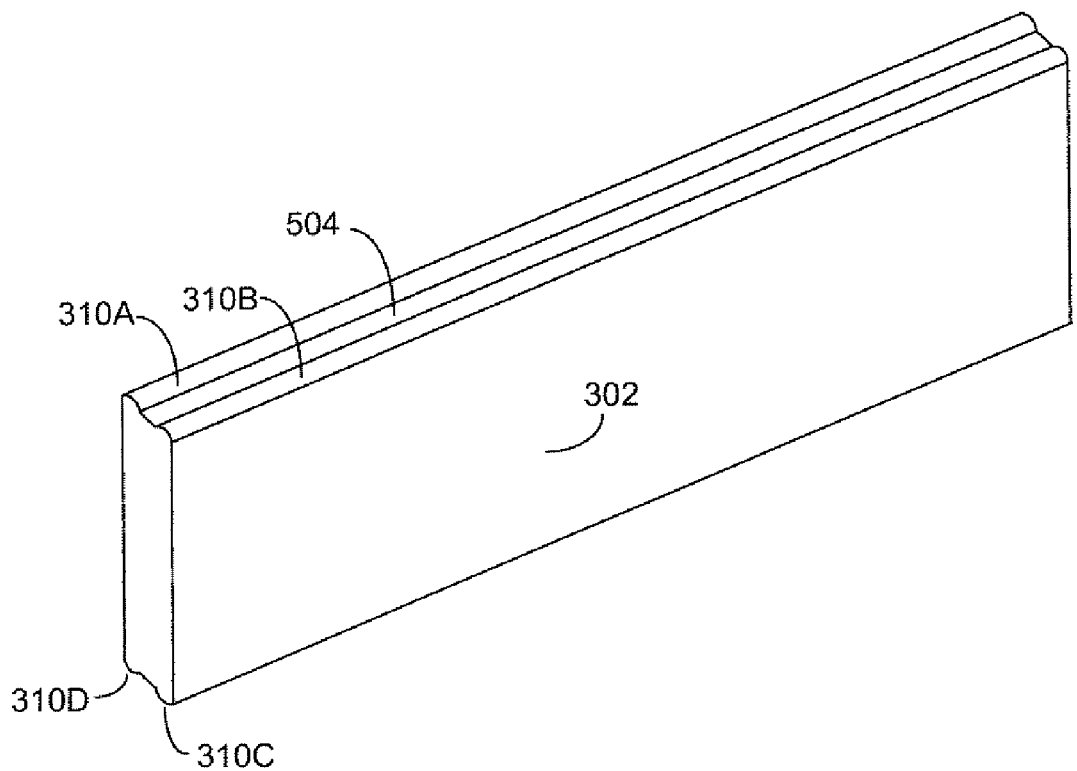
FIG. 5 illustrates a perspective view of an exemplary embodiment of a form factor.

FIG. 5 illustrates a perspective view of an exemplary embodiment of the form factor 302. As depicted, the rounded end surfaces 310A-B extend along the length of the top of the form factor 302. The rounded end surfaces 310 may be identically sized, or alternatively, for each pair (e.g., 310A-B or 310C-D), one may be larger than the other. A flat recess 504 may be positioned in between the rounded end surfaces 310A-B. The rounded end surfaces 310C-D may similarly extend along the length of the bottom of the form factor 302. In an exemplary alternative embodiment, other non-rounded shapes, asymmetrical or symmetrical shapes, geometric or non-geometric shapes may be used instead of the rounded end surfaces 310A-D.

Figure 6A:
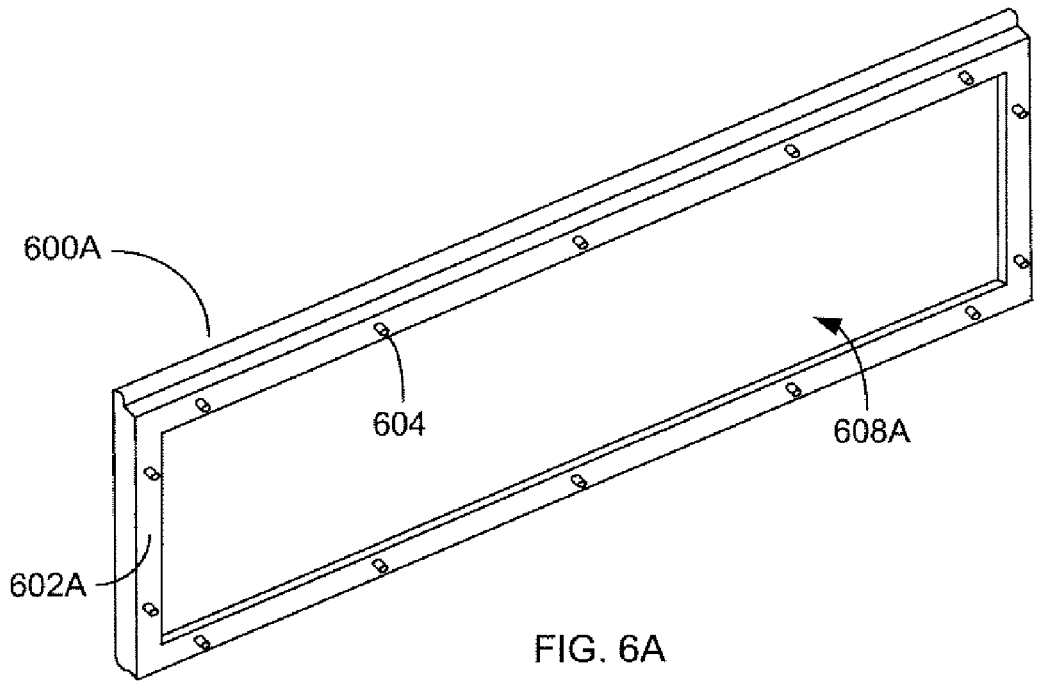
FIGS. 6A-C illustrates a perspective and exploded views of an exemplary embodiment of a form factor.
Figure 6B:
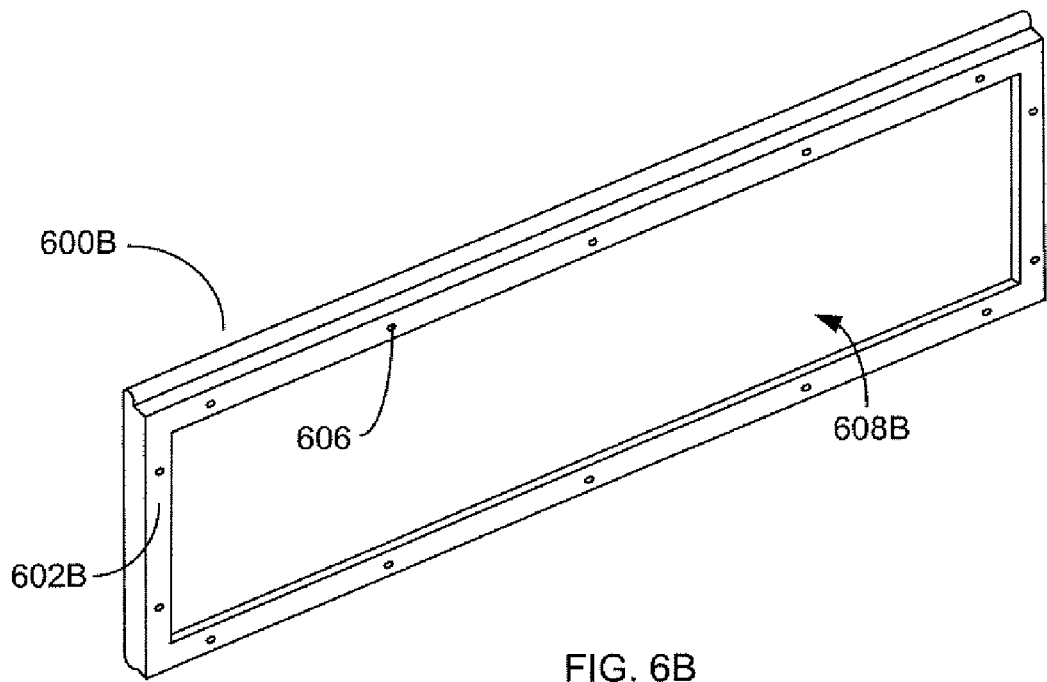
Figure 6C:
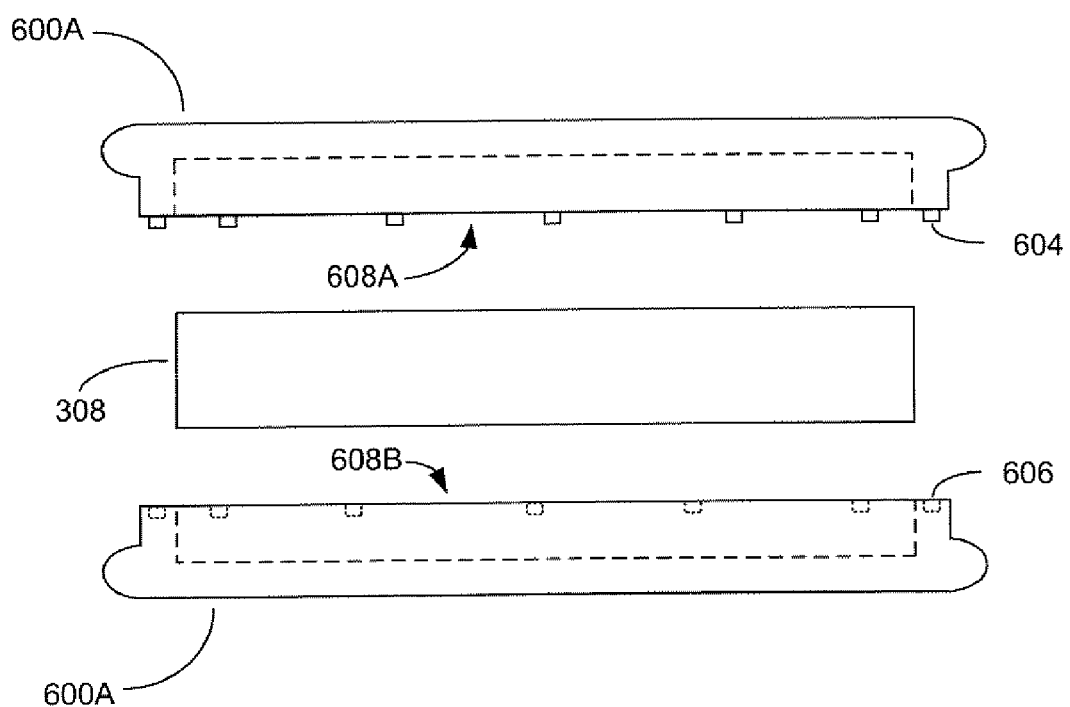

FIGS. 6A-C illustrate an exemplary alternative embodiment of the form factor 302. Instead of being a single device molded over the transmitter 308, the form factor 302 may comprise two pieces that are coupleable with one another. FIG. 6A depicts an exemplary embodiment of a first piece 600A, FIG. 6B depicts an exemplary embodiment of a second piece 600B, and FIG. 6C depicts an exploded view of exemplary embodiments of the first piece 600A, the second piece 600B, and the transmitter 308. The first piece 600A may include a first surface 602A that extends along the perimeter of a recess 608A. One or more first interlocking devices 604, such as, but not limited to, a peg, may be positioned on the first surface 602A. The one or more interlocking devices 604 may be uniformly or non-uniformly spaced on the first surface 602A. The second piece may include a second surface 602B that extends along the perimeter of a recess 608B. One or more second interlocking devices 606, such as, but not limited to, a hole, may be positioned on the second surface 602A. The locations of the one or more second interlocking devices 606 may correspond to the locations of the one or more first interlocking devices 604 such that the second interlocking devices 606 may interact with the first interlocking devices 604 to couple the first piece 600A together with the second piece 600B. The transmitter 308 may be placed between the first piece 600A and the second piece 600A during coupling of the first piece 600A with the second piece 600B such that the transmitter 308 may be enclosed by the first piece 600A and the second piece 600B (see FIG. 6C). Additionally, in a further exemplary embodiment, an adhesive may be applied to the first surface 602A and/or the second surface 602B during coupling to adhesively couple the first piece 600A to the second piece 600B. The adhesive may substantially prevent gases and/or fluids from reaching the transmitter 308.

Figure 7:
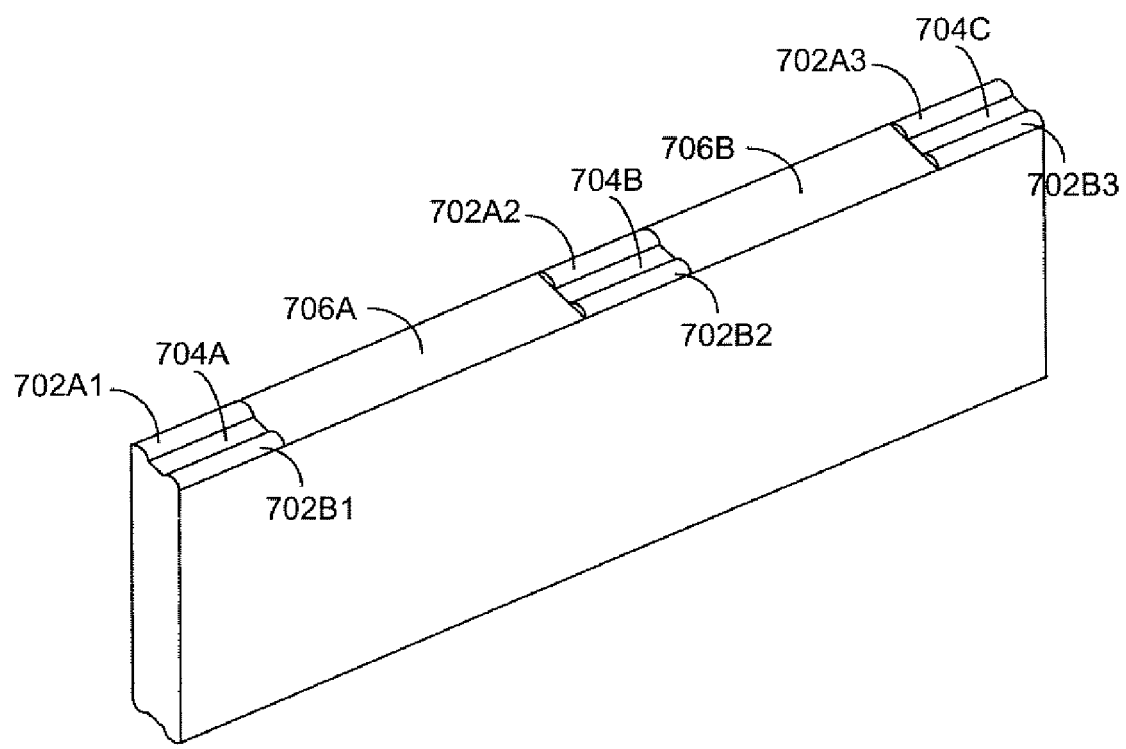
FIG. 7 illustrates a perspective view of an exemplary embodiment of a form factor.

FIG. 7 illustrates a further exemplary embodiment of the form factor 302. In contrast with the exemplary embodiment illustrated in FIG. 5, the rounded end surfaces may not completely extend along the top and bottom of the form factor 302. As depicted in FIG. 7, rounded end surfaces 702 only may extend alone a portion of the top of the form factor. FIG. 7 depicts three segments of rounded end surfaces 702, the first segment includes rounded end surfaces 702A1 and 702B1 and a recess 704A, which are adjacent to a flat section 706A. On the other side of the flat section 706A is the second segment, which includes rounded end surfaces 702A2 and 702B2 and a recess 704B. A flat section 706B is adjacent to the second segment. On the other side of the flat section 706B is the third segment, which includes rounded end surfaces 702A3 and 702B3 and a recess 704C. The bottom of the form factor 302 may include three segments similar to that depicted on the top of the form factor 302 in FIG. 7. Having multiple segments (such as, but not limited to, end surfaces 702A1, 702B1 and recess 704A, and end surfaces 702A2, 702B2 and recess 704B) separated by a flat section (such as, but not limited to, 706A) may affect the ability to insert and remove the form factor 302. Having segments along only a portion of the top or bottom surface may permit easier insertion or removal of the form factor 302 since less surfaces will frictionally engage during insertion and removal. Thus, the length of the end surfaces (such as, but not limited to, end surfaces 702A1, 702B1) relative to the flat section (such as, but not limited to, 706A) may be adjusted depending on how secure the user wishes the form factor 302 to be when attached to the tray 100. It is noted that the three segments are exemplary, more or less segments may be included on the top and/or bottom of the form factor 302. Additionally, the top of the form factor 302 may include multiple segments, while the bottom may include rounded end surfaces that extend along the entire length of the form factor 302. Other combinations may be used, as will be appreciated by those of skill in the art.

The transmitter 308 embedded in the form factor 302 may store information to identify and track the tray 100. In various exemplary embodiments, the transmitter 308 may be any device capable of wirelessly communicating RF, UHF, microwave frequency signals, or other wireless signals capable of containing information. The transmitter 308 may be a miniature electronic circuit that may include a microprocessor, which may be configured in a miniature small outline package (MSOP) for integrated circuits. In various exemplary embodiments, the transmitter 308 may include a linear antenna design with a moderate antenna gain. In an exemplary embodiment, the antenna gain may be 8 dbi. In an alternative exemplary embodiment, the antenna may have other non-linear antenna designs or other antenna gains that permit a reader to receive information from the transmitter 308. Other antennas and transmitters 308 may be used, as will be appreciated by those of skill in the art.

The transmitter 308 may or may not comprise an integral power supply. The transmitter 308 may be adapted to wirelessly communicate in various wireless environments. Various wireless environments may include responding to a RF signal emitted from a RU field generator, where, upon receipt, the RF signal energizes the circuitry of the transmitter 308, which may cause the transmitter 308 to transmit a response signal with information about the transmitter 308. The transmitter 308 may be referred to as passive in this wireless environment. Passive transmitters 304 may not contain a power source and may become inductively or capacitively charged when they receive the RU signal from the RF field generator. This also may be referred to as wireless signal powered or beam powered. Alternatively, the transmitter 308 may be active and periodically or aperiodically transmit signals. Active transmitters may have their own power source, such as, but not limited to, a battery. When an active transmitter receives the RF signal, the RU signal may energize the circuitry and may turn on the transmitter 308, which then may emit a signal containing its stored information.

In an exemplary embodiment, the transmitter 308 may include an RFID tag. The basic structure and operation of RFID tags can be found in, for example, U.S. Pat. Nos. 4,075,632, 4,360,801, 4,390,880, 4,739,328 and 5,030,807, the disclosures of which are incorporated herein by reference in their entireties. In various exemplary embodiments, the transmitter 308 may be state machine oriented, have global lock capability, write to every non-locked byte, have multiple functions, write to one byte individually, have bulk write capability, have group select capability, be anti-collision capable (e.g., may sort X number of transmitters per second), have cyclic redundancy check (CRC) 16 messaging, operate over −40° C. to +85° C., and may have high speed operation. The transmitter 308 may have other features, and/or various combinations of these features, as will be appreciated by those skilled in the art.

The transmitter 308 may transmit data within specified frequency bands that conform to regulatory standards for the country in which the transmitter 308 is used. In various exemplary embodiments, the transmitter 308 may operate in the frequency band of 860-960 MHz. Alternatively, the transmitter 308 may operate at other frequency bands to conform with the regulatory standards of the host country or to the needs of the system, as will be appreciated by those skilled in the art.

The transmitter 308 may be rugged enough to survive typical use in a surgical environment. The transmitter 308 may be designed to survive multiple sterilization cycles that trays in a surgical environment may be exposed to, such as, but not limited to, autoclaving and citric passivation baths. Alternatively, the transmitter 308 may be designed to survive other harsh environments. Various exemplary embodiments may permit the transmitter 308 to survive harsh environments to which the tray 100 may be exposed, such as, but not limited to, extreme temperatures, high pressure, vibrations, droppage of the tray 100, and harsh chemicals.

The transmitter 308 also may include a memory. The memory may include read/write functionality, which may allow certain stored information in the memory to be altered, re-evaluated, and read. The memory may have both locked and unlocked memory. Generally, the locked portion of the memory may be read only, and may not be changed without physically reprogramming the memory. The locked portion of the memory may store a unique identification number for identifying the transmitter 308 that corresponds to the tray 100. The unique identification number may be used to index a database containing price, product name, manufacturer, and/or other information that may be used to track the tray 100 over its life cycle.

The unlocked portion of the memory may store information on events occurring in the life cycle of the tray 100. The unlocked portion of the memory also may be modified by information contained in RF signals received by the transmitter 308 from the RF field generator. This information stored and received may include, but is not limited to, the number of times the tray 100 has been used, identification numbers of the surgery in which the tray 100 was used, the number of times the tray 100 has been sterilized, the dates of inspection of the tray 100, the operator who performed the inspection of the tray 100, the name of the surgeon who used instruments on the tray 100 during surgery, the location at which the tray 100 was last scanned, the names of the locations or hospitals where the tray 100 has been used, the manufacturer of the tray 100, a model number and/or product name for the tray 100, the source of the tray 100, the destination of the tray 100, and/or other information that may be used to track the travel, usage, storage, and inspection of the tray 100 over its life cycle.

Figure 8:
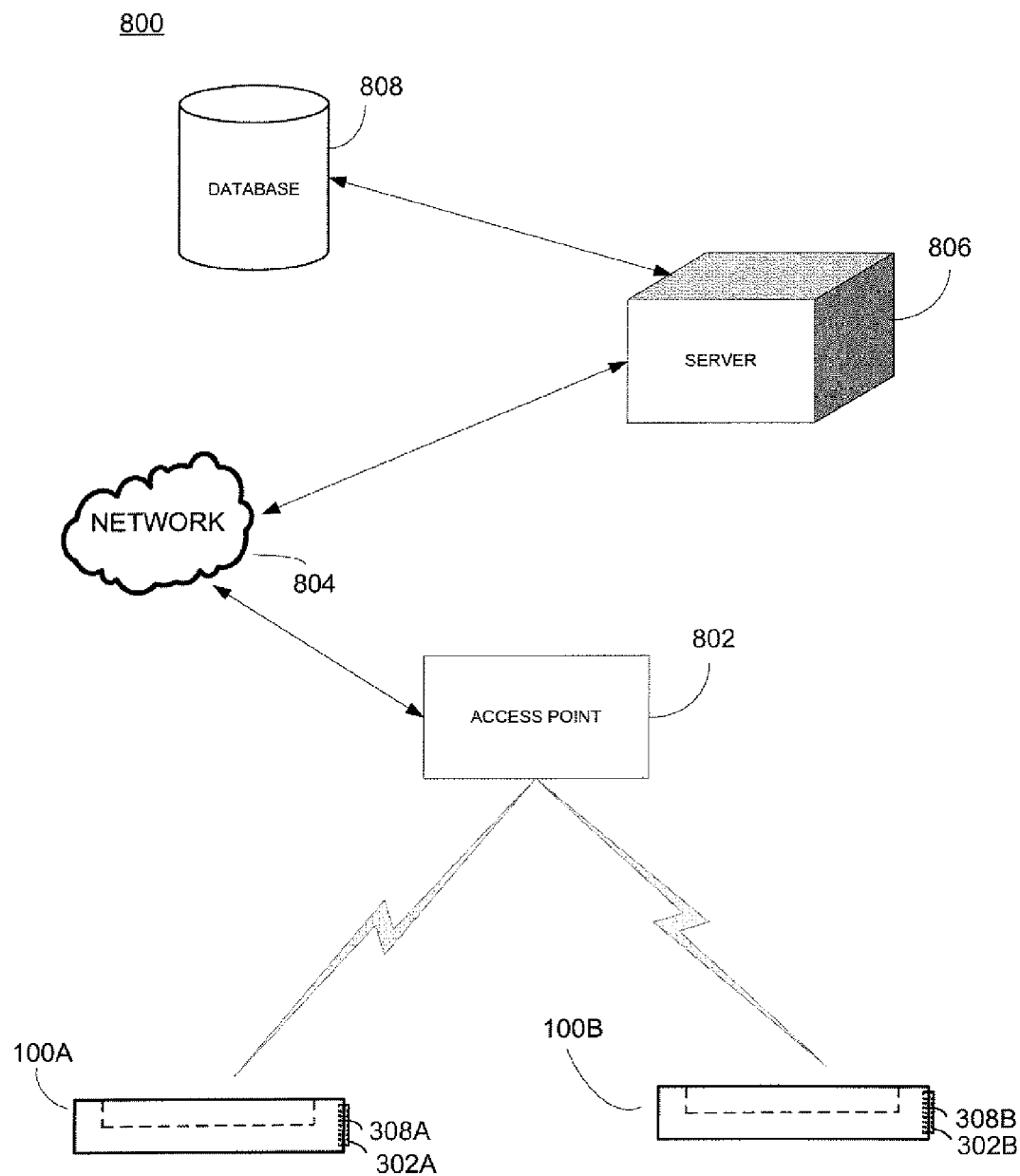
FIG. 8 illustrates an exemplary embodiment of a system for monitoring one or more trays having an inserted form factor.

The transmitter 308 embedded within the form factor 304 may transmit data useable to track and monitor the tray 100 in a system. FIG. 8 illustrates an exemplary embodiment of a system 800 communicating with trays 100A-B having respectively embedded transmitters 308A-B. In the depicted embodiment, the system 800 may include trays 100A-B, an Access Point 802, a Network 804, a Server 806, and a Database 808. In an alternative embodiment, the trays 100A-B may be placed and closed within a container, such as, but not limited to, a tote, where the trays 100A-B may not be externally visible to an operator. The system 800 may respectively allow transmitters 308A-B within form factors 302A-B associated with the trays 100A-B to wirelessly communicate information through the Access Point 802 and the Network 804 to the Server 806 and the Database 808. The Access Point 802 may directly connect to the Network 804, or may connect through a local area network (LAN), a wireless LAN (WLAN), an Internet Service Provider (ISP), or other methods for connecting to a network, which are known and are omitted for brevity.

The Access Point 802 may be a computing device that wirelessly communicates with the transmitters 308A-B. In various exemplary embodiments, the Access Point 802 may be a wireless reader device and may include an RF field generator (reader) to wirelessly extract identification information, such as, but not limited to, a Universal Product Code (UPC), a product name, a unique identification number, or other information stored in the locked and unlocked portions of the memory of the transmitter 308 useable to identify the tray 100 and/or the transmitter 308. The Access Point 802 also may comply with the regulatory standards of the host country. For example, in the United States and in North America, RF field generators may conform with Federal Communications Commission (FCC) unlicensed requirements, such as FCC Part 15. Europe sets similar standards, such as ETSI 300.400 869 MHz operation. Other countries may recognize either FCC or ETSI requirements or require the RF field generators to meet different requirements. One of ordinary skill in the art will appreciate that it is within the scope of the various exemplary embodiments that the transmitter 308 and the Access Point 802 may be modified to meet various regulatory requirements of the host country. Additionally, the transmitter 308 and the Access Point 802 also may be modified to communicate in various frequency bands to function within the system 800, as will be appreciated by those skilled in the art.

In an exemplary embodiment in a surgical environment, the trays 100A-B may be sent through a RF field generated by the Access Point 802. When the transmitters 308A-B of trays 100A-B enter the RF field, the RF field energizes circuitry of the transmitters 308A-B causing the circuitry to perform a data operation. In various exemplary embodiments, the data operation may cause the transmitters 308A-B to respectively transmit a wireless signal, such as, but not limited to, a RF or UHF signal, containing extraction data. The extraction data may include the identification information stored in the locked portion of the memory of the transmitters 308A-B, and/or may include information stored in the unlocked portion of the memory. Alternatively, the RF field generated by the Access Point 802 also may communicate update information to the transmitters 308A-B to update the information stored in the unlocked portion of the memory.

After the Access Point 802 receives the wireless signal containing the extraction data from the transmitter 308, the Access Point 802 may communicate the extraction data to the Server 806, the Database 808, or both. The identification information in the extraction data may be used to track the tray 100 to determine its location, to determine if the tray 100 has been sent to the correction/incorrect location, to track the number of uses of the tray 100, or other information about the tray 100 over its life cycle. The Server 806 and/or the Database 808 may include a database table that stores information on each tray 100 similar to that stored in the locked and unlocked portions of the memory of the transmitter 308. The database table may allow for management, tracking, and processing of the tray 100.

In a surgical environment, the Server 806, the Database 808, or both may review the identification information on one or more of the trays 100A-B communicated from the Access Point 802 to determine how each of the trays 100A-B may be processed For example, Server 806, the Database 808, or both may determine if the trays 100A-B correspond to different manufacturers or sterilization processors and identify to which location each of the trays 100A-B may be forwarded. This may be beneficial since manufacturers or sterilization processors typically only service and sterilize their own instruments and trays. After reviewing the identification information from the trays 100A-B, the Server 806, the Database 808, or both, may, for example, communicate a signal for display to an operator at the Access Point 802 indicating where the tray 100 should be forwarded (e.g., but not limited to, storage, manufacturer, sterilization process, or other locations, etc.). Alternatively, the Server 806, the Database 808, or both may, for example, communicate a signal instructing the operator how to process the tray 100. The Server 806, the Database 808, or both may communicate a signal containing other information that the operator may use to process the tray 100, as will be appreciated by those skilled in the art.

Thus, the transmitters 308A-B embedded in the respective trays 100A-B may prevent the trays 100A-B from improperly being sent to the wrong manufacturers or sterilization processors. The transmitter 308 according to the various exemplary embodiments discussed herein may provide an efficient and effective solution for utilizing wireless identification techniques on trays and other objects that may be able to withstand heat, cold, chemical exposure, physical stress and other environmental hazards. The transmitter 308 within the form factor 302 may be invisible or unobtrusive to the user of the tray 100, but still allow for rapid, accurate, automatic, non-orientation restrictive identification and processing of the tray 100 in various processes of supply chain usages, tracking, and managing use of the tray 100. Moreover, the form factor 302 may be easily attachable to the tray 100 to permit tracking and management of proprietary and third party trays. Therefore, the exemplary embodiments describe an identification system for a tray that may save time in identifying trays, while being able to sustain the harsh environments the tray may experience.

Though the form factor 302 may be depicted as being inserted into the slot 102 of the side wall 106 of the tray 100, it should be appreciated that the slot 102 may be positioned on other surfaces of the tray 100, such as, but not limited to, a bottom surface, an end surface, the planar top surface 304, a non-planar top surface, or any other location on the tray 100 of sufficient size to receive the form factor 302, as will be appreciated by those skilled in the art. Hence, inserting the form factor 302 into the tray 100 only may minimally affect the physical appearance, esthetics, function, or ergonomics of the tray 100 for users.

Indeed, various modifications of the embodiments, in addition to those described herein, will be apparent to those of ordinary skill in the art from the foregoing description and accompanying drawings. Thus, such modifications are intended to fall within the scope of the embodiments. Further, although some of the embodiments have been described herein in the context of a particular implementation in a particular environment for a particular purpose, those of ordinary skill in the art will recognize that its usefulness is not limited thereto and that the embodiments can be beneficially implemented in any number of environments for any number of purposes.

The invention claimed is:

1. A tray comprising:
   a sidewall having a slot formed therein, the slot being adapted to engage a form factor, the form factor having a transmitter embedded therein, wherein when the form factor is inserted into the slot, the transmitter is adapted to communicate information useable to identify the tray.

2. The tray according to claim 1, wherein the form factor is adapted to frictionally engage the tray within the slot.

3. The tray according to claim 1, wherein the transmitter comprises a radio frequency identification (RFID) tag.

4. The tray according to claim 1, wherein the transmitter is adapted to store identification information that uniquely identifies the transmitter and/or the tray.

5. The tray according to claim 1, wherein when the form factor is inserted into the slot, a wall of the form factor substantially corresponds to the plane of the sidewall.

6. The tray according to claim 1, wherein the information includes one or more of:
   a usage number, a surgery identification number, a sterilization number, an inspection date, an inspector name, a surgeon name, a location, a hospital name, a manufacturer, a model number, a product name, a source, a destination, a storage facility, and/or any combination thereof.

7. The tray according to claim 1, wherein the form factor is adapted to protect the transmitter from one or more of: heat, cold, moisture, overpressure, shock, torsion, compression, sterilization, impact, and/or any combination thereof.

8. The tray according to claim 1, wherein the form factor is composed of:
a reinforced thermoplastic, a thermally resistant polymer, a plastic, a resin, a glass, rubber, graphite, Lucite, an amorphous thermoplastic polyetherimide, a polyphenylene sulfide, a ceramic material, a ceramic/metal composite, and/or any combination thereof.

9. The tray according to claim 1, wherein the form factor is composed of a material that permits propagation of radio frequency signals.

10. The tray according to claim 1, wherein when the form factor is inserted into the slot, the form factor is adapted to maintain the transmitter at a minimum distance away from the tray.

11. The tray according to claim 1, wherein the transmitter is ruggedized.

* * * * *